(No Model.) 8 Sheets—Sheet 6.
G. A. FULLERTON.
HEEL STIFFENER MACHINE.
No. 390,585. Patented Oct. 2, 1888.
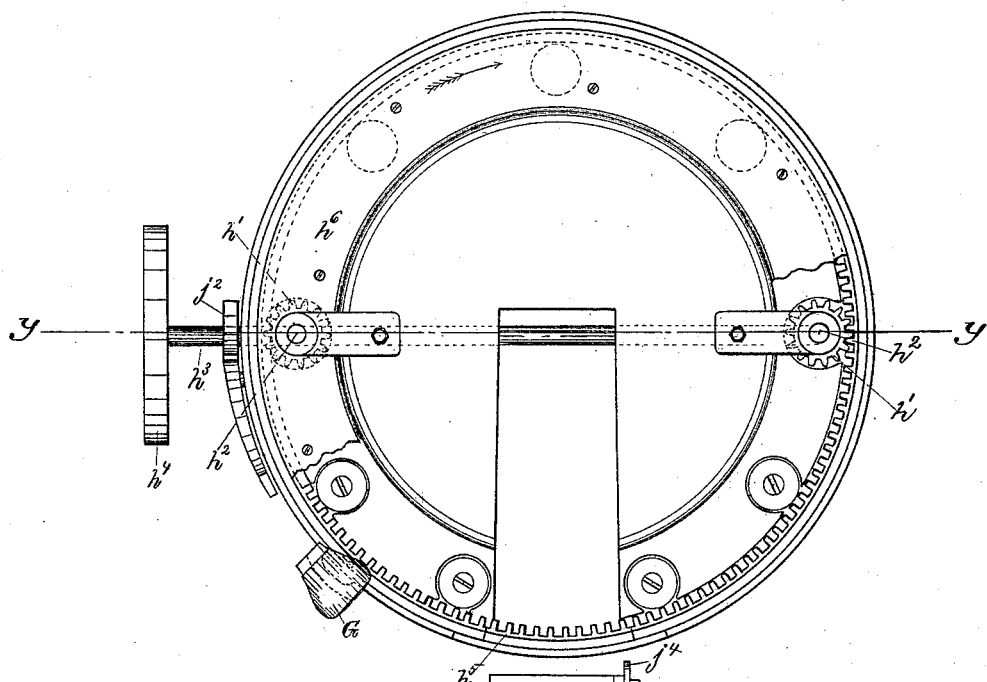
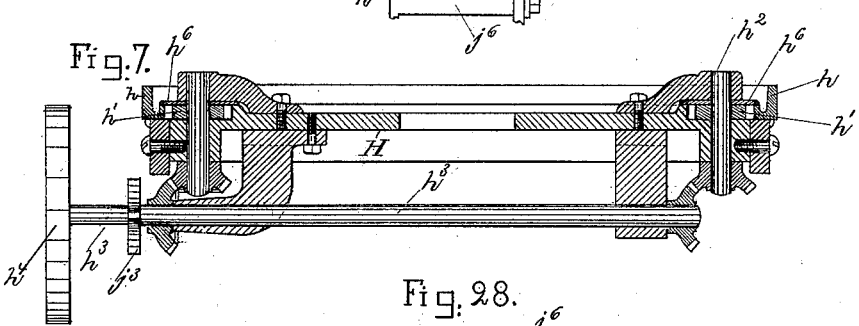
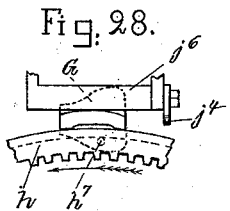
Witnesses.
Lauritz W. Möller.
John R. Snow.
Inventor.
George A. Fullerton (No Model.) 8 Sheets—Sheet 7.

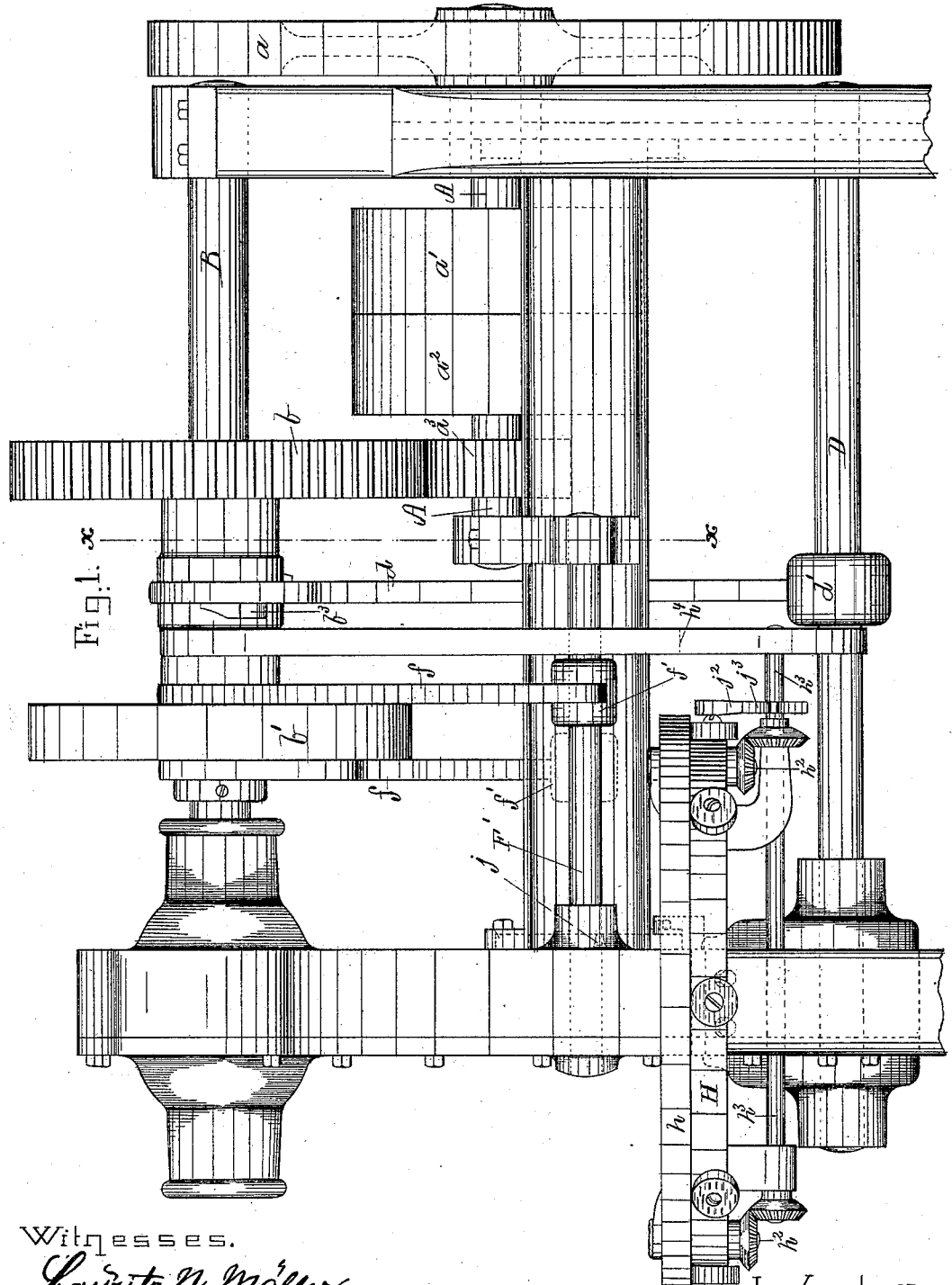

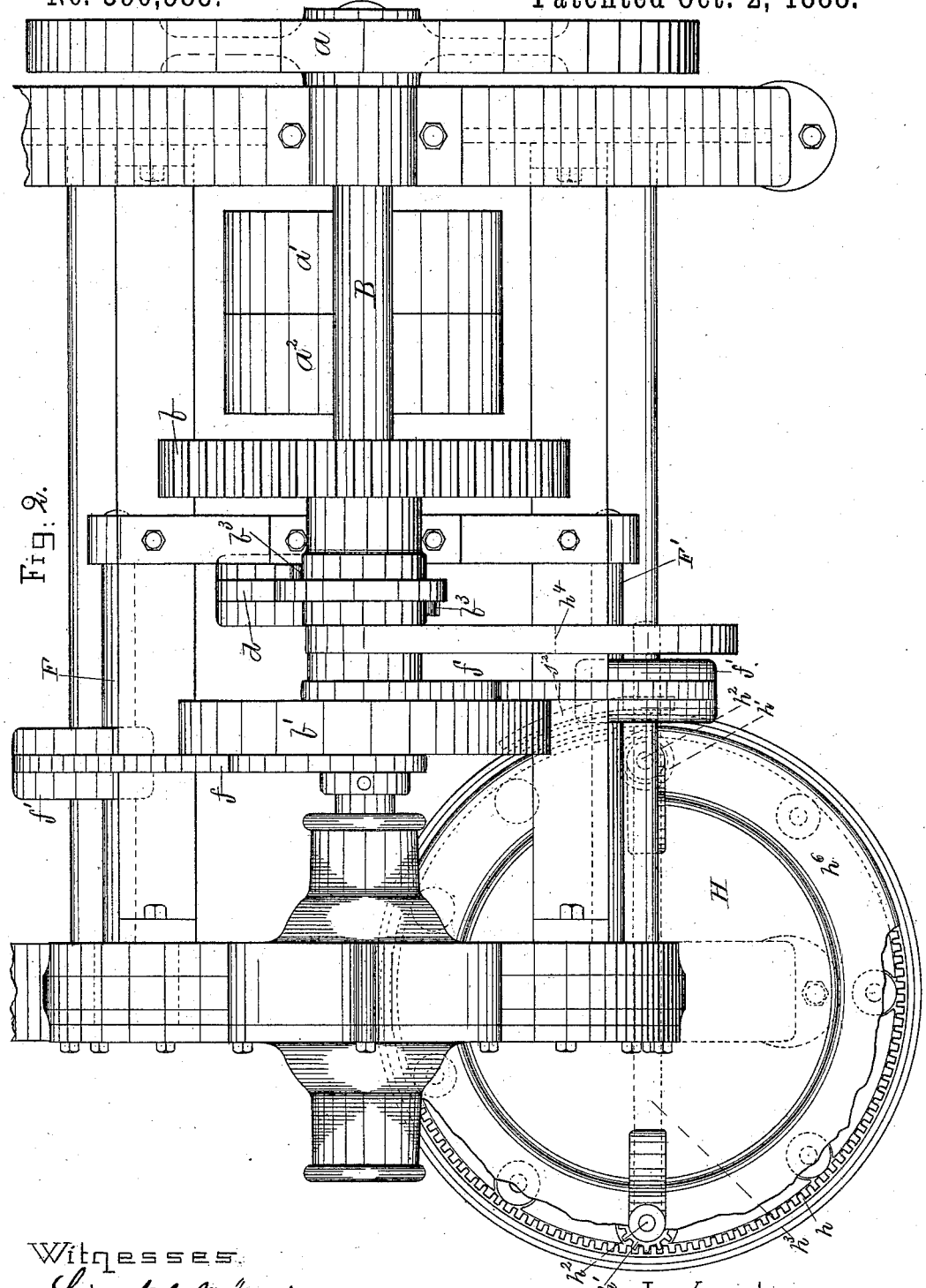

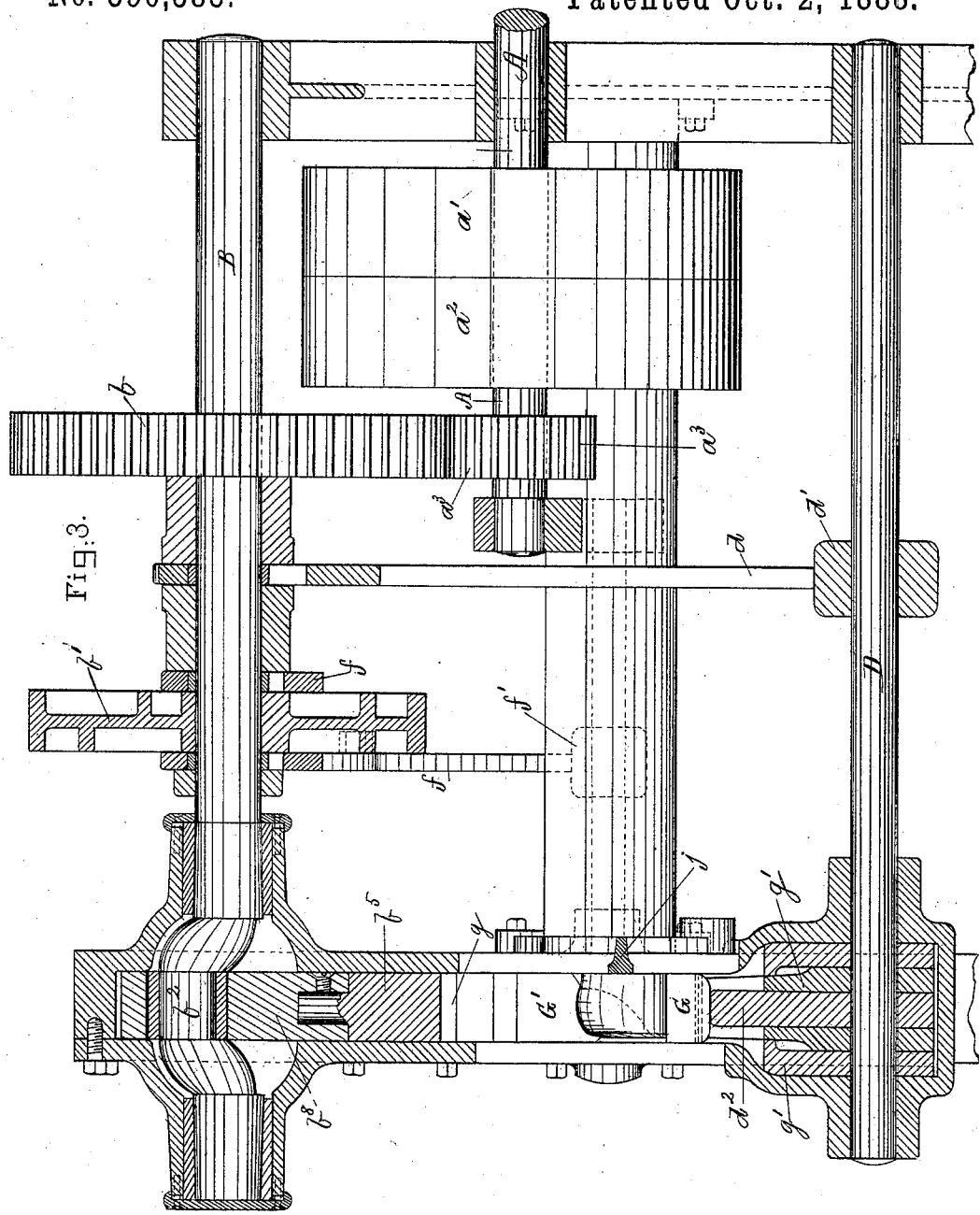

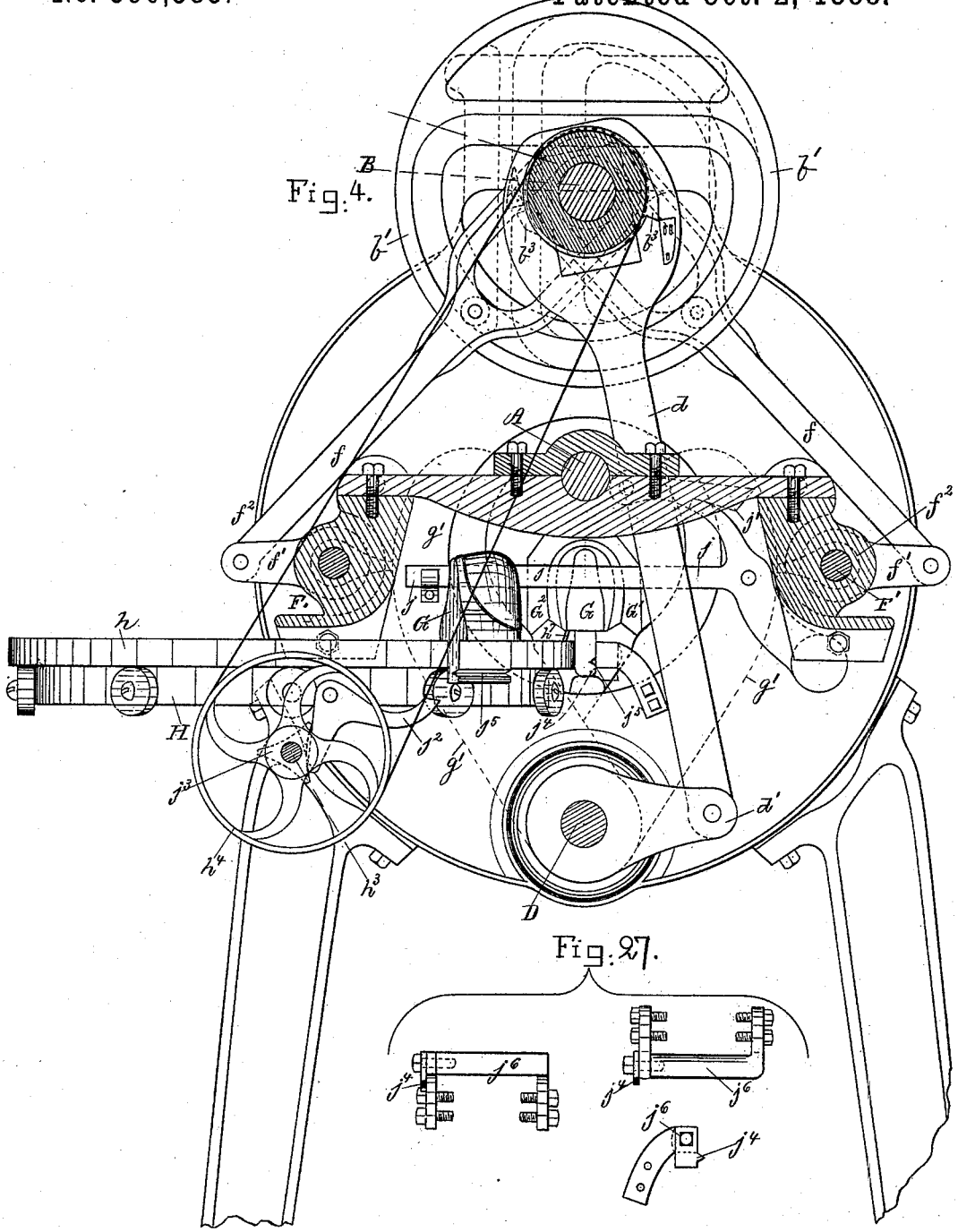

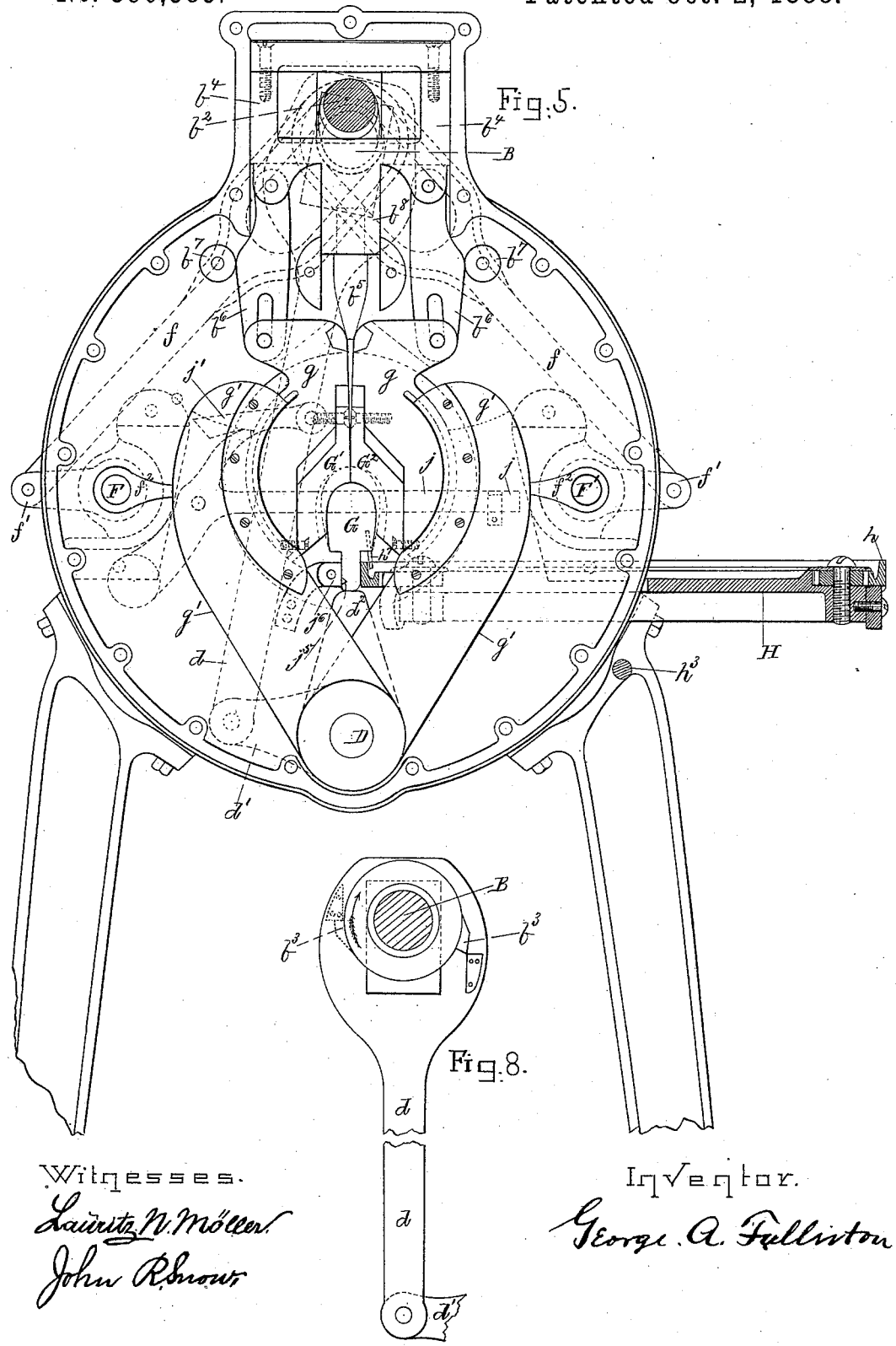

G. A. FULLERTON.
HEEL STIFFENER MACHINE.

No. 390,585. Patented Oct. 2, 1888.

Witnesses.
Lauritz N. Möller.
John R. Snow.

Inventor.
George A. Fullerton.

(No Model.) 8 Sheets—Sheet 8.

G. A. FULLERTON.
HEEL STIFFENER MACHINE.

No. 390,585. Patented Oct. 2, 1888.

Witnesses.
Lauritz N. Möller.
John R. Snow.

Inventor.
George A. Fullerton

UNITED STATES PATENT OFFICE.

GEORGE A. FULLERTON, OF BOSTON, MASSACHUSETTS.

HEEL-STIFFENER MACHINE.

SPECIFICATION forming part of Letters Patent No. 390,585, dated October 2, 1888.

Application filed August 18, 1884. Serial No. 140,811. (No model.)

*To all whom it may concern:*

Be it known that I, GEORGE A. FULLERTON, of Boston, in the county of Suffolk and State of Massachusetts, have invented certain Improvements in Machines for Molding Counters and other Articles, of which the following is a specification, reference being had to the accompanying drawings, making a part hereof.

Figure 9:
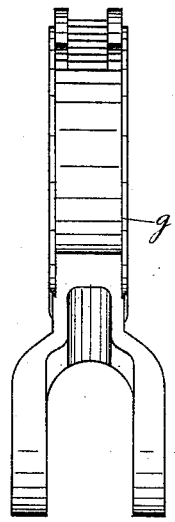
Figure 10:
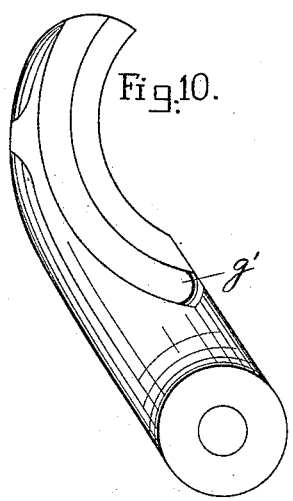
Figure 11:
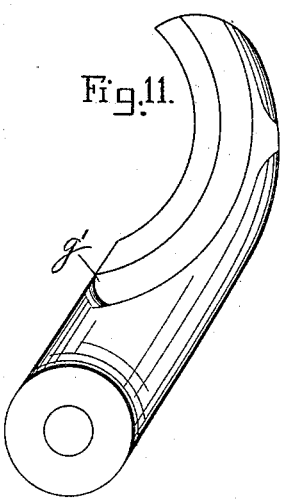
Figure 12:
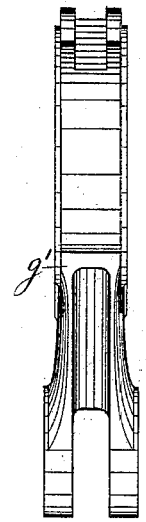
Figures 13, 14:
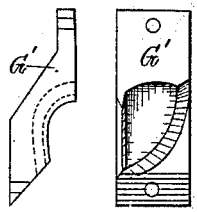
Figure 15:
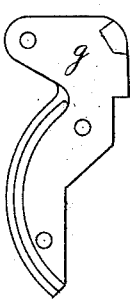
Figure 16:
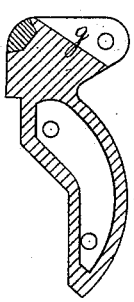
Figure 17:
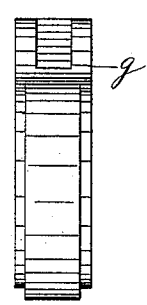
Figure 18:
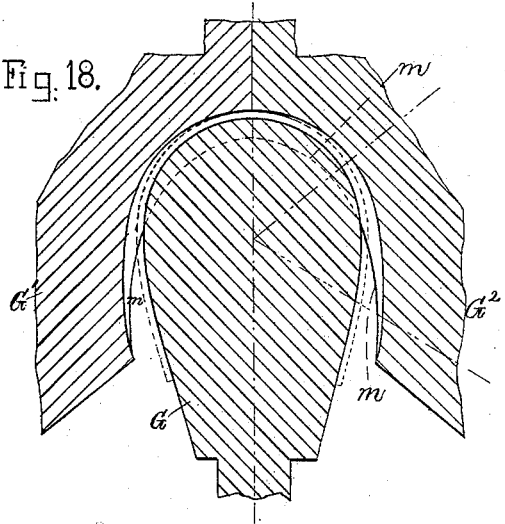
Figure 19:
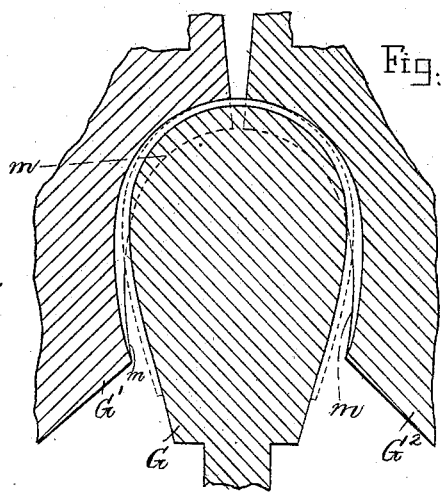
Figure 20:
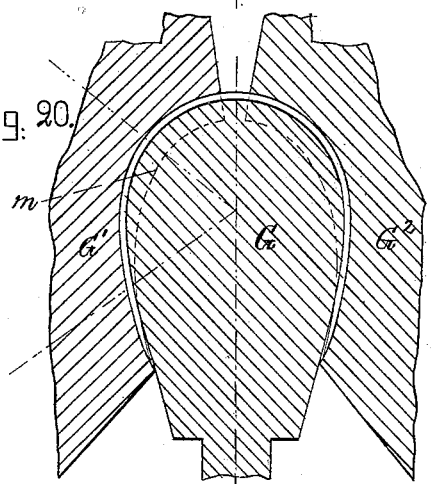

In the drawings I have shown the best form of my machine, Figure 1 being a side view; Fig. 2, a plan; Fig. 3, a central vertical section; Fig. 4, a section on line $x\ x$, Fig. 1; Fig. 5, a partial front view; Fig. 6, a plan of the feed-table; Fig. 7, a section on line $y\ y$, Fig. 6. Fig. 8 is a view to show the wiper-cam in its relation to the connecting-rod and main shaft, which is shown in cross-section. Figs. 9, 10, 11, and 12 are different views of the ways, hereinafter described. Figs. 13 and 14 are different views of the female mold. Figs. 15, 16, and 17 are different views of the female-mold carrier. Figs. 18, 19, and 20 are sectional diagrams to show the male and female molds in different positions, and also to show a cutting-ridge, hereinafter explained. Figs. 21, 22, 23, 24, 25, and 26 are also sectional diagrams showing the male and female molds in different positions. Fig. 27 shows the abutment and its finger, hereinafter described; and Fig. 28 is an under plan of the male mold, part of the abutment, and carrier, described below.

The main features of my invention consist, first, in the combination of a male mold with a sectional female mold, the parts of which are adapted to slide over the molded articles and the male mold when it is brought into place, and then open to allow the male mold and the molded blank to pass on between the parts of the female mold, the chief purpose being, first, to mold the blank midway between its extremities and then to mold it from its middle portion toward its extremities, and also to allow each male mold after the molding operation and after the parts of the female mold are separated to pass on instead of drawing it back in the usual way, and, secondly, in a novel construction and operation of a female mold, fully described below.

The other features of my invention relate to the mechanism for holding and operating the molds and for bringing the male molds successively into proper relation with the female mold.

In the drawings, A represents the main shaft, $a$ being the balance-wheel, $a'\ a^2$ fast and loose pulleys, and $a^3$ a pinion which meshes with gear $b$ on the shaft B. The shaft B carries a double cam, $b'$, (for operating the ways on which the carriers of the female mold slide,) a crank, $b^2$, (for operating the wedge and links which give motion to the female-mold carriers,) and also a wiper-cam, $b^3$, (for operating the rock-shaft D.)

The rock-shaft D receives a rocking motion from the wiper cam $b^3$ through the connecting-rod $d$, which is lifted as the wiper moves up and thrown down as the wiper moves down, as will be clear from Fig. 8, which is a detail showing the wiper-cam $b^3$ in its relation with the connecting-rod $d$. The connecting-rod $d$ is pinned to the arm $d'$, which is fast to the rock-shaft D. The arm $d'$ is shown in Figs. 4 and 5 and partially in Fig. 8. The office of the rock-shaft D is to lift the male mold by means of the cam $d^2$ when the tang of the male mold is brought over the cam $d^2$, as shown in Fig. 5.

The double cam $b'$ operates the two rock-shafts F F' by means of the connecting-rods $f$, each of which is pinned to an arm, $f'$, which arm is fast to its rock-shaft. The rods $f$ are steadied by means of a slot, through which the shaft B passes, and a cam-roll on each arm $f$ works in a cam groove cut in the double cam $b'$, so that both rods $f$ move together, and therefore both rock-shafts F F' rock at the same time, and, by means of the cams $f^2$, force the ways $g'$ of the female-mold carriers $g$ to place and hold them firmly in place, the rock-shafts F F' remaining motionless, while the cam-rolls on the connecting-rods $f$ are in contact with the concentric portions of the cam-grooves of the double cam $b'$. (See Figs. 4 and 5.)

The crank $b^2$ gives a reciprocating motion to the carriage $b^4$ by means of the slide-block $b^8$, and this carriage operates the female-mold carriers $g$ by means of the wedge $b^5$ and links $b^6$. As the carriage $b^4$ is thrown in one direction, the wedge $b^5$ enters between the carriers $g$ and forces them apart, the links $b^6$ opening to admit of that motion of the carriers $g$. On the back-stroke of the carriage $b^4$ the wedge $b^5$ is withdrawn from between the carriers $g$, and the links $b^6$ pull the carriers back to place, the sides of the links acting as cams against the rollers $b^7$, which are mounted on studs fast to the frame of the machine. The operation of these parts is as follows: The blank having been placed upon the male mold G, and the male mold having been brought into position on the cam $d^2$, it is raised by the motion of the cam $d^2$, as shown in Fig. 5, and forced up into the female mold G' G² with great force, and as the parts G' G² of the female mold are at that time in the position shown in Figs. 5 and 18—that is, in contact along a line corresponding to the heel-seam of a shoe—the counter is molded along its middle rear portion. As soon as the male mold is thus brought into place, the carriage $b^4$ is moved by its crank $b^2$, forcing the wedge $b^5$ in between the female-mold carriers $g$ and compelling them to move in their ways $g'$, and this compels the parts G' G² of the female mold (fast to the carriers $g$) to move, as indicated in the diagrams, Figs. 18, 19, and 20, which illustrate the positions of the male and female mold at the two extremes and the reverse, Fig. 18 showing their position just before the parts G' G² move, Fig. 19 showing their position when their parts have about half completed their motion, and Fig. 20 showing their position when the parts G' G² have completed the molding. The rock-shaft D rocks back and carries cam $d^2$ away from mold G as soon as the parts G' G² have completed their stroke, and the rock-shafts F F' also rock back and carry the cams $f^2$ away from the mold-carrier ways $g'$, which separate by gravity, aided by suitable springs, (not shown,) each carrying with it its mold-carrier $g$ and mold G' or G², thereby having ample room for taking out mold G and putting in another, ready to be forced up into the female mold when its parts G' G² are brought together, as in Fig. 5, by the operation of the cams $f^2$ on the ways $g'$ and of the links $b^6$ on the carriers $g$.

The molding-surface of parts G' G² of the female mold is made the converse of that part of the counter nearest it when in the position shown in Fig. 20, and each part is so shaped that they can be brought together, as in Fig. 18, and also so shaped that it can be firmly secured to its carrier $g$.

My machine, as shown in the drawings, is intended more especially for making the counters described in my patent, No. 299,125, dated May 27, 1884, but is obviously applicable to other counters.

Another important advantage is that the working-surfaces of the female mold may be so shaped as to cut off the edges of a blank cut slightly in excess of the size required for a given-sized counter, and thereby produce counters which are uniform in size and are skived or thinned at their edges if the proper material be used for the blank.

In Figs. 18, 19, and 20 a cutter, $m$, is formed on the female mold, which is shaped to correspond with the upper edge of the counter, and which cuts off all that part of the blank which extends beyond it when the parts G' G² are forced into the position shown in Fig. 20. This cutter $m$ may be formed in the male mold G, or partly on the male and partly on the female cutter, in which is preferably a mere ridge, which is almost essential in making counters from blanks which stretch unequally, and constitutes a second feature of my invention.

In order to feed the male molds, the table H is secured to the frame of the machine, and in this table is mounted the male-mold carrier $h$. (See Figs. 6 and 7, which show these parts detached; also Figs. 1, 2, 4, and 5.) The carrier $h$ is revolved by the gears $h'$, which are fast to shafts $h^2$, and these shafts $h^2$ receive motion from the shaft $h^3$, which is revolved by pulley $h^4$, bolted, in Figs. 1 and 2, to a drum on shaft B. For convenience the carrier is made in two sections, as indicated at $h^5$, Fig. 6. The carrier rests on rollers, as shown, and is partly covered by plate $h^6$. The tang of the male mold G is in contact at two points with the periphery of the carrier $h$, and a pin, $h^7$, projecting from the male mold, enters a groove in the carrier. The attendant places a counter-blank on a male mold, and partially shapes it by hand to the male mold when it is a blank of the kind described in my patent, and then places the male mold upon the carrier. The motion of the carrier carries the male mold around until it is stopped by the gate $j$. (See Figs. 4 and 5.) This gate is closed, so that the male mold is stopped by it with its tang directly over the cam $d^2$. The gate remains closed until the female-mold carrier $g$ is moved in its ways $g'$, when the gate is raised by the pawl $j'$, and when the ways $g'$ move back the pawl $j'$, which is pinioned to the carrier $g$, clears the projection on the gate $j$, and the gate closes again. In Fig. 4 the male mold shown in perspective has been carried through the gate by the carrier $h$, and the gate has closed behind it and arrested the male mold shown in elevation.

In making counters of the kind described in my patent, which require to be heated after they are molded, the male molds are knocked off the carrier by the lever $j^2$, which is moved by the cam $j^3$, fast on shaft $h^3$, the outer arm of lever $j^2$ lifting the male molds as they are brought along by the carrier, so that they fall sidewise onto a suitable belt or conveyer, (not shown,) by which they are carried through a chamber properly heated.

When a male mold is brought against the gate $j$, with its tang in place to be operated upon by cam $d^2$, it is guided and held in line by the abutment $j^6$.

In practice it is desirable to use a finger on the front face of the abutment $j^6$, which enters a groove across the tang of the male mold, the different sizes of male molds having this groove in different parts of the tang, so that when the finger is adjusted all male molds of a size not adapted for the female mold G' G² then in the machine will be stopped by the finger coming in contact with the tang either above or below the groove, while the proper-sized male molds will not be stopped by the finger, because it will project into the groove. This is a detail of considerable practical importance, as many male molds are used with one pair of female molds, and each male mold must be accurately fitted for that pair of female molds. The finger is marked $j^4$, and the groove in the tang of the male mold $j^5$. (See Figs. 4, 5, and 27, which are a plan, side elevation, and front elevation of the abutment and its finger.)

Figs. 9 to 12 are views of the ways $g'$, Figs. 15, 16, and 17 are views of the female-mold carrier $g$, and Figs. 13 and 14 of one section of the female mold.

Figure 24:
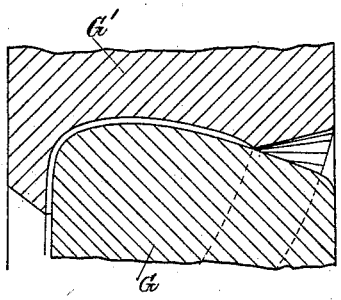
Figure 25:
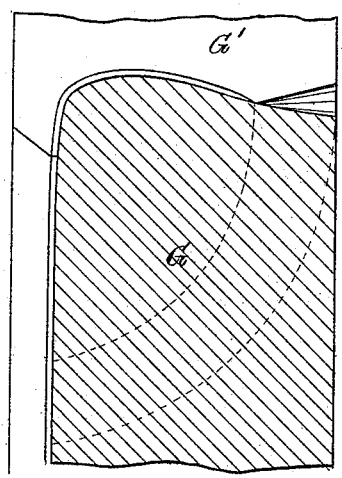
Figure 26:
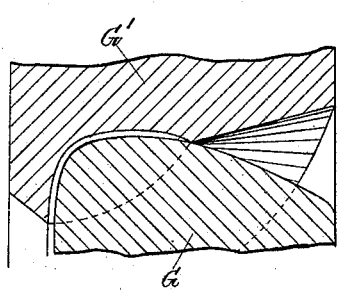
Figure 21:
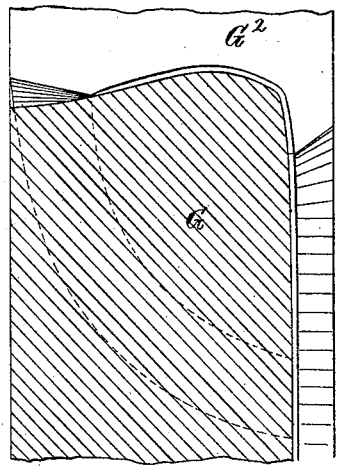
Figure 22:
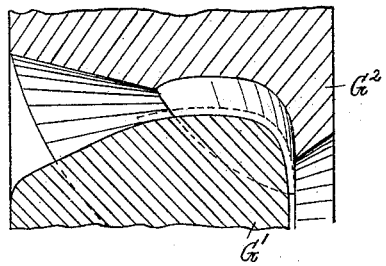
Figure 23:
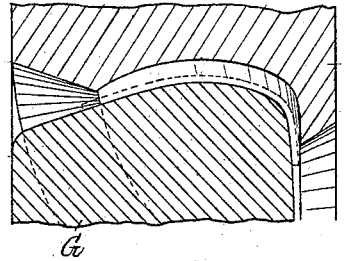

Figs. 21 to 26 are sectional diagrams showing the profiles of the working-surfaces of the male and female molds, one set of these diagrams, Figs. 21, 22 and 23, showing the relation of these surfaces at three planes when the female mold is in the position shown in Fig. 18, the other set, Figs. 24, 25 and 26, showing that relation at the same planes when the female mold is in the position shown in Fig. 24. These diagrams, in connection with Figs. 18, 19 and 20, will make plain the construction and operation of my new female mold and its striking novelty.

Fig. 28 is an under plan of the male mold G and part of the abutment and carrier $h$.

It will be clear that while it is desirable in the manufacture of counters to move the parts of the female mold upon arcs of a circle, as shown in the drawings, to complete the molding, yet the parts of the female mold may reciprocate toward and from each other on ways which are not arcs. I am the first, so far as I know, to produce any form of molding-machine in which the female mold was made in two or more sections which were brought together to act in conjunction with the male mold, and then separated sufficiently to give free passage to the male mold, and then slid bodily over the male mold; and this feature of my invention is of great value whenever it is desired to use a series of male molds with a single female mold and have the male molds pass successively through the machine.

It will be obvious that the female mold and its connections may be forced upon the male mold, (in which case the male molds will have but one motion,) instead of forcing the male mold into the female mold, as shown in the drawings, this being a mere detail of construction and not a matter of principle.

The operation is as follows: The male molds, each with a blank properly arranged upon it, are carried around by the carrier $h$ until one of them is stopped by the gate, (see Fig. 4,) and the male mold cannot enter between the sections G' G² of the female mold until the ways $g'$ are moved apart. The size and shape of the male molds are such that when one is stopped by the gate it will itself act as a stop to keep the one next it out of the way of the sections G' G² as they are brought together. When the molding is completed and the ways $g'$ are moved apart, the male mold just operated on is released and carried forward by the carrier $h$, the gate being raised, as before described, for that purpose; but the gate falls before the next male mold is brought into place by the carrier $h$. Thus, although the carries $h$ moves constantly, yet only one male mold at a time can be got into place.

I am aware of Hynes's patent, No. 260,205, dated June 27, 1882, and disclaim all that is described in it, my molding devices differing radically from Hynes's in being adapted to mold the counter at its middle portion before molding the side portions of the counter.

I am also aware of Prior's patent, No. 235,962, dated December 28, 1880, and disclaim all that is shown in it.

What I claim as my invention is—

1. In a molding-machine, the female mold G' G², having working-surfaces the converse of the side portions of the male mold G, in combination with the male mold G, the female mold receiving the male mold and fitting it along its middle portion, and the portions G' G² of the female mold sliding on the male mold, all arranged and operating substantially as described, and for the purpose set forth.

2. In combination with the male mold G and female mold G' G², the cutter $m$, substantially as described.

3. In combination, the female mold G' and female mold G², male mold G, carriers $g$, and ways $g'$, all substantially as described.

4. The male mold and its carrier $h$, mounted and operating substantially as shown, for feeding the male molds, in combination with the female mold G' G², substantially as described.

5. In combination, the cam acting on the male mold to force it into the female mold, the male-mold carrier for presenting the male molds successively in proper relation to the cam and the female mold, and the abutment for guiding the male mold when operated upon by the cam, all substantially as described.

6. In a heel-stiffener machine, the guard-finger $j^4$, in combination with the tang of the male mold, grooved at $j^5$, substantially as and for the purpose specified.

7. The molding-machine above described, consisting, essentially, of a single female mold made in sections which reciprocate toward and from the side portions of the male mold, the reciprocating carriers in which the sections are mounted, and a series of male molds which reciprocate, and a male-mold carrier by which the male molds are presented successively to the action of the reciprocating sections of the female mold, all arranged and operating substantially as described.

8. In combination, the reciprocating sections of the female mold, the reciprocating carriers in which the sections are mounted, the male mold, the male-mold carrier, and the automatic gate for stopping the male mold in proper relation to the female mold, the male molds being held frictionally in their carrier and being reciprocated into and away from the female mold, substantially as described.

GEORGE A. FULLERTON.

Witnesses:
W. A. COPELAND,
JOHN R. SNOW.